United States Patent
Johansson et al.

(10) Patent No.: US 12,365,139 B2
(45) Date of Patent: Jul. 22, 2025

(54) SYSTEM AND METHOD FOR THREE-DIMENSIONAL PRINTING OF A VEHICLE COMPONENT ASSOCIATED WITH VEHICLE OPERATIONS

(71) Applicant: Volvo Truck Corporation, Gothenburg (SE)

(72) Inventors: Christian Johansson, Mölndal (SE); Anders Nilsson, Västra Frölunda (SE); Linus Eklund, Kullavik (SE); Leo Ekblom, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 407 days.

(21) Appl. No.: 17/785,707

(22) PCT Filed: Feb. 6, 2020

(86) PCT No.: PCT/EP2020/052995
§ 371 (c)(1),
(2) Date: Jun. 15, 2022

(87) PCT Pub. No.: WO2021/155933
PCT Pub. Date: Aug. 12, 2021

(65) Prior Publication Data
US 2023/0047693 A1    Feb. 16, 2023

(51) Int. Cl.
*B29C 64/386*    (2017.01)
*B33Y 50/00*    (2015.01)
*B33Y 80/00*    (2015.01)

(52) U.S. Cl.
CPC ............ *B29C 64/386* (2017.08); *B33Y 50/00* (2014.12); *B33Y 80/00* (2014.12)

(58) Field of Classification Search
None
See application file for complete search history.

(56) References Cited

U.S. PATENT DOCUMENTS

| | | |
|---|---|---|
| 10,166,719 B1 | 1/2019 | Yang et al. |
| 10,339,728 B1 | 7/2019 | Oakes et al. |
| 2014/0371895 A1* | 12/2014 | Sadusk ................. B33Y 10/00 700/98 |
| 2015/0057784 A1 | 2/2015 | Butler et al. |
| 2015/0294030 A1 | 10/2015 | Cudak et al. |

(Continued)

FOREIGN PATENT DOCUMENTS

| | | |
|---|---|---|
| CN | 204594444 U | 8/2015 |
| CN | 105383056 A | 3/2016 |

(Continued)

OTHER PUBLICATIONS

First Office Action for Chinese Patent Application No. 201980098061.7, mailed Dec. 7, 2023, 17 pages.

(Continued)

*Primary Examiner* — Bernard G Lindsay
(74) *Attorney, Agent, or Firm* — Withrow & Terranova, PLLC (57) ABSTRACT

The present disclosure relates to a computer implemented method for three-dimensional (3D) printing, for example for 3D printing spare parts for a vehicle. The present disclosure also relates to a corresponding arrangement and to a computer program product.

16 Claims, 4 Drawing Sheets

(56) References Cited

U.S. PATENT DOCUMENTS

| | | |
|---|---|---|
| 2016/0019009 A1 | 1/2016 | Land |
| 2016/0116904 A1 | 4/2016 | Jensen et al. |
| 2018/0014609 A1 | 1/2018 | Bruce et al. |
| 2018/0261008 A1 | 9/2018 | Elber |
| 2018/0264861 A1 | 9/2018 | Ozawa |
| 2019/0118480 A1 | 4/2019 | Abello Rosello et al. |
| 2019/0235480 A1 | 8/2019 | Crandall |
| 2020/0103857 A1 | 4/2020 | Wynne et al. |
| 2020/0307102 A1* | 10/2020 | Swallow ............... B33Y 50/02 |
| 2021/0214013 A1* | 7/2021 | Monteith ............... B62D 25/08 |
| 2021/0241128 A1* | 8/2021 | Gusikhin ........... G05B 23/0283 |
| 2021/0302947 A1* | 9/2021 | Crandall .......... G06Q 10/06316 |
| 2022/0276633 A1 | 9/2022 | Nilsson et al. |

FOREIGN PATENT DOCUMENTS

| | | |
|---|---|---|
| CN | 105835373 A | 8/2016 |
| CN | 205800890 U | 12/2016 |
| CN | 108748990 A | 11/2018 |
| CN | 109311131 A | 2/2019 |
| CN | 109476085 A | 3/2019 |
| CN | 109937132 A | 6/2019 |
| DE | 102016013232 A1 | 5/2017 |
| EP | 3476598 A1 | 5/2019 |
| JP | 2001322266 A | 11/2001 |
| JP | 2005059353 A | 3/2005 |
| JP | 2010020765 A | 1/2010 |
| JP | 2016137674 A | 8/2016 |
| JP | 2016224592 A | 12/2016 |
| KR | 20160092424 A | 8/2016 |
| KR | 20180064332 A | 6/2018 |
| WO | 2018065159 A1 | 4/2018 |

OTHER PUBLICATIONS

International Search Report and Written Opinion of the International Searching Authority, PCT/EP2019/067686, mailed Mar. 24, 2020, 17 pages.

Final Office Action for U.S. Appl. No. 17/622,887, mailed Jun. 26, 2024, 17 pages.

Applicant-Initiated Interview Summary for U.S. Appl. No. 17/622,887, mailed Aug. 26, 2024, 2 pages.

Advisory Action and AFCP 2.0 Decision for U.S. Appl. No. 17/622,887, mailed Sep. 6, 2024, 4 pages.

Examination Report for European Patent Application No. 20705145.9, mailed Sep. 1, 2023, 6 pages.

International Search Report and Written Opinion for International Patent Application No. PCT/EP2020/052995, mailed Oct. 21, 2020, 13 pages.

Non-Final Office Action for U.S. Appl. No. 17/622,887, mailed Feb. 13, 2024, 16 pages.

First Office Action for Chinese Patent Application No. 202080093676.3, mailed Apr. 17, 2025, 23 pages.

* cited by examiner

SYSTEM AND METHOD FOR THREE-DIMENSIONAL PRINTING OF A VEHICLE COMPONENT ASSOCIATED WITH VEHICLE OPERATIONS

This application is a 35 USC 371 national phase filing of International Application No. PCT/EP2020/052995, filed Feb. 6, 2020, the disclosure of which is incorporated herein by reference in its entirety.

TECHNICAL FIELD

The present disclosure relates to a computer implemented method for three-dimensional (3D) printing, for example for 3D printing spare parts for a vehicle. The present disclosure also relates to a corresponding arrangement and to a computer program product.

BACKGROUND

Recently there have been great advances in three-dimensional printing technologies, also known as 3D printing, pushing the boundaries of different types of materials that may be used in 3D printing as well as in relation to improvements in the quality and mechanical strength of objects manufactured using such 3D printing technologies.

3D printing provides a way of quickly producing objects using many different 3D printing technologies, including stereo-lithography, selective laser sintering and fused filament fabrication (FFF), which is also referred to as fused deposition modeling (FDM). Although fabrication of an object using 3D printing is rapid compared to conventional manufacturing techniques such as injection molding, milling or casting, it can still take many hours, depending on the size of the object. Additionally, the maximum size of objects that can be printed may be limited by the printing envelope (or tray size) of the 3D printer.

An example of an improvement in 3D printing is disclosed in US20150057784, where the process of 3D printing is improved by segmenting input jobs and/or combining parts of input jobs together thereby improving utilization of the 3D printer.

Specifically, the method according to US 20150057784 improves throughput and reduces printing latency by providing for dividing jobs into multiple parts that can be printed in parallel on a single 3D printer or on more than one 3D printer, using pre-printed or pre-formed blocks in combination with printed parts to complete a job, combining multiple jobs within a single printing envelope (i.e. within the print tray of a single 3D printer), reorienting object, enabling jobs to be added on the fly (i.e. whilst an existing separate job is being printed), such that different objects may start at different vertical heights above the tray, enabling jobs to be amended or cancelled during printing; enabling jobs to be removed during printing, and enabling printing to start before the entire 3D design of the object has been completed.

When a 3D printed part is to replace an original part manufactured using conventional manufacturing technologies, it may be undesirable to print an exact copy of the original part. The 3D printed part may have different mechanical and structural properties compared to the original part. The materials used for 3D printing may exhibit properties making a 3D printed copy mechanically inferior compared to an original part manufactured using conventional manufacturing technologies.

In addition to the above, from a general perspective it may in some situations be desirable to allow the designer of the 3D printed part to have slightly larger flexibility as compared to when manufacturing the original part. With the above in mind, it would be desirable to provide further enhancements for improving 3D printing of parts for replacing original parts manufactured using conventional manufacturing technologies.

SUMMARY

According to an aspect of the present disclosure, the above is at least partly alleviated by a computer implemented method for three-dimensional (3D) printing of at least one component for a vehicle, the method comprising the steps of receiving, at a processing unit, a request to form a first vehicle component, acquiring, using the processing unit, a first 3D bounding space for the first vehicle component, forming, using the processing unit, a 3D model for the first vehicle component based on the request and the first 3D bounding space, and instructing, using the processing unit, a 3D printer to print the 3D model.

The overall idea of the present disclosure is to implement a method for 3D-printing of a component for a vehicle based on a 3D model of the component. The 3D model further has a relation to a 3D bounding space for the component, such as for example in some embodiments relating to where the component is to be arranged or mounted. Forming the 3D model of the component may for example be limited in space by the first 3D bounding space and may not share the exact shape or form of an original vehicle component. An original vehicle component may generally be based on extensive mechanical design and optimization for a specific manufacturing method and it may sometimes be unfavorable to 3D print an original vehicle component. In such cases it may possibly be necessary to add material to the component in order to be able to handle the mechanical loads to the component. However, the 3D space for mounting a vehicle component may be limited, such that adding material to a model of an original vehicle component without taking into account space for mounting and operation is not possible. The present method accounts for this by forming the first 3D bounding space for the vehicle component, outlining 3D space limitations for the vehicle component. After printing the 3D model, the vehicle component may be installed in a vehicle and the vehicle may continue to function until a time when an original vehicle component, or spare part, may be installed.

The vehicle may generally be any type of vehicle, such as e.g. one of a bus, a truck, a car, or any form of construction equipment or working machine. The vehicle may furthermore be at least one of a pure electrical vehicle (PEV) and a hybrid electric vehicle (HEV). The vehicle may also be a marine vessel.

In line with the present disclosure there is included a step of receiving a request to form a first vehicle component. The request may possibly be received at a processing unit and the request may be done by an automated control system or by user interaction. For instance, the request may be done by a human operator working at a service center or an aftermarket vehicle component supplier. The request may comprise a first 3D model of the first vehicle component and/or a parts number for the first vehicle component. The request may further be done by a vehicle operator.

After receiving the request to form the first vehicle component, the first 3D bounding space for the first vehicle component may be acquired. The first 3D bounding space may for example be downloaded from a database of vehicle components and may be provided by the vehicle manufacturer, a vehicle component manufacturer, a service center or an aftermarket component supplier. The it may also be possible to download a 3D model of the first vehicle component in the form of an original vehicle component from the database, using the parts number for the first vehicle component. In addition, the database may comprise additional information regarding the vehicle component, such as vehicle part number, availability in a service center, availability in a central storage facility, overall dimensions, structural data regarding operational and maximum loads the vehicle component may handle, materials the vehicle component is made of, materials the vehicle component may be 3D printed in, printing technologies the vehicle component may be 3D printed with, as well as required mechanical tolerances for the vehicle component. In addition, such information regarding the vehicle component may form part of the request to form the first vehicle component.

Based on the request to form the first vehicle component and the first 3D bounding space for the first vehicle component, a 3D model is formed for the first vehicle component. The formed 3D model may in some embodiments be functionally the same as the original vehicle component but may be different in shape, weight and material. In one example, forming the 3D model takes into account the available 3D printing materials of 3D printer, and in particular the material properties of the 3D printing materials.

The 3D model may be of any known computer-generated file format for representing a 3D model of a vehicle component. The processing unit may connect to the 3D model database through the Internet or the 3D model database may be located locally to the processing unit. The 3D model may be of any common file format such as but not limited to STL, OBJ, FBX, COLLADA, 3DS, IGES; STEP, and VRML/X3D.

After forming the 3D model for the first vehicle component, a 3D printer is instructed to print the 3D model. The 3D printer may in some embodiments be located in a manufacturing facility specializing in 3D printing. Such a manufacturing facility may also be a conventional mechanical shop provided with 3D printing machines. In some other embodiments the 3D printer may be arranged locally, such as with the vehicle (or a dedicated mobile service vehicle).

The instructions sent to the 3D printer may comprise data relating to each printing step for the 3D printer (layer by layer data) in a format readable by the 3D printer. Alternatively, the processing unit may send the formed 3D model to the 3D printer and the 3D printer in turn converts the formed 3D model to machine instructions, or printing steps for printing the formed 3D model.

Any 3D printing techniques may be used to print the common 3D model. 3D printing may also be referred to as additive manufacturing wherein material is added to an object being printed in a layer by layer manner, as opposed to subtractive manufacturing (milling, drilling, turning) wherein material is removed from a blank in order to form an object.

The 3D printer may use any known 3D printing technique such as Selective Laser Sintering (SLS), Selective Laser Melting (SLM), Electronic Beam Melting (EBM) or 3D arc welding. In 3D arc welding the 3D printing head is replaced by a welding torch. 3D arc welding may be done in both 3-axis and 5-axis.

In an embodiment, the first 3D bounding space for the first vehicle component is dependent on predefined physical boundaries in a vicinity of an expected mounting position, on a vehicle of the first vehicle component. This allows for the 3D model of the first vehicle component to be formed having a different 3D shape compared to an original vehicle component and may allow the 3D model to be adapted to a specific 3D printing method. In addition, a first vehicle component printed from the formed 3D model may be manufactured using different, and possibly weaker, but more cost-efficient material to print. By basing the 3D model on first vehicle component and the related 3D bounding space, the 3D model may account for the difference in material by, for instance making portions of the model having a larger cross-sectional area. One non-limiting example of the above, is a lower control arm or lower wishbone of a vehicle. The portions of the lower control arm adapted to interface with and mount to the vehicle may comprise first predefined physical boundaries for the lower control arm. Distances between the vehicle body, the vehicle suspension assembly and the lower control arm, taking into account movement of the lower control arm and suspension assembly as a wheel moves up and down during vehicle use, may comprise second physical boundaries. Using said first and second physical boundaries a 3D model of the lower control arm may be formed, printed, installed and used on the vehicle without any interference or fouling during suspension assembly moving up and down.

In another embodiment, the method may comprise receiving, at the processing unit, a first indication of an undesirable operation of the vehicle, identifying, using the processing unit, at least the first vehicle component as relating to the undesirable operation of the vehicle. Based on an indication of an undesirable operation of the vehicle the processing unit may identify that a first vehicle component is may be the probable source for the undesirable operation of the vehicle. The first vehicle component may be worn, partly damaged or failed completely and therefore in need of a replacement vehicle component.

For example, the first vehicle component may be an engine component, a suspension component, a driveline component or any other vehicle components. The present disclosure may beneficial for any vehicle component needed for safe and efficient vehicle operation. The first indication of an undesirable operation of the vehicle may be detected using one or a plurality of onboard sensors and received by the processing unit. Such a processing unit may in one embodiment be an electronic control unit (ECU), typically provided as an onboard component of the vehicle. Correspondingly, the sensors may for example include sensors for determining "what is happening within and in a surrounding of the vehicle", for example including at least one of a radar, a LiDAR sensor and/or a camera. Other sensors for measuring speed, vibration, acceleration, inclination, torque, vehicle mass, etc. may be equally used in determining the desired general action plan to be performed by the vehicle.

In a further embodiment, at least a second vehicle component is identified as relating to the undesirable operation of the vehicle. This is beneficial in cases where the exact vehicle component being faulty and the reason for the undesirable operation of the vehicle may not be directly determined (e.g. in case it is uncertain as to the reason for the undesirable operation). The method may then be adapted to determine that a first and/or a second vehicle component are the probable causes of the undesirable operation of the vehicle.

In one embodiment, the second vehicle component is defined as the first 3D bounding space for the first vehicle component. For example, when the second vehicle component may be completely encompassed by the first vehicle component, a 3D printed model of the first vehicle component and the related 3D bounding space may be manufactured into the second vehicle component using secondary manufacturing techniques. This allows printing of the formed 3D model to commence before knowledge about the exact one of the first and second vehicle components being faulty may be known.

In another embodiment, the 3D model is further formed based on the second vehicle component. This is beneficial in that the formed and printed 3D model of the vehicle component may be based on both the first and the second vehicle component wherein the first and the second vehicle component forms a 3D model. One non-limiting example may be wherein a vehicle component comprises a first and a second vehicle component mounted to each other. For instance, conventional manufacturing technology may make it economically more beneficial to produce the first and the second vehicle components separately and subsequently mount them together to form a vehicle component. However, 3D printing technology may allow the first and second vehicle component to be printed as one single part. This may further allow for a stronger part to be printed as no interface for mounting the first and second vehicle component together is necessary.

In addition to the above, using the first 3D bounding space allows for, when more than one vehicle component is identified as relating to the undesirable operation of the vehicle, 3D printing to start of a 3D model being a geometric combination of the shape or form of the identified vehicle components. Such a 3D model being a combination of the first and the second vehicle component may be referred to as a common 3D model. This step may be performed before the exact one vehicle component of the identified vehicle components has been identified as the source of the undesirable operation of the vehicle. Before the exact one faulty vehicle component is identified the vehicle may be needed to be inspected by a service technician and the method may thus reduce the time needed to replace a vehicle component by starting 3D printing based on the best knowledge on hand at a time close to when the early indication of undesirable operation of the vehicle takes place. The method may allow for a reduction in printing time as two completely separate parts are not printed. This allows for vehicle fleet operators to reduce vehicle downtime and in turn improve productivity of the vehicle, in particular, when the vehicle is a commercial vehicle. The common 3D model may be based on shape similarities between the first and the second vehicle component further, taking into account the respective 3D bounding spaces.

In line with the present disclosure it may be possible to, based on a 3D model for each of the first and the second vehicle component, compare the 3D model for each of the first and the second vehicle component to identify shape similarities therebetween, form a common 3D model for the first and the second vehicle component based on the shape similarities, and the instruct a 3D printer to print the common 3D model.

Identifying shape similarities may involve using an algorithm or a combination of algorithms. This may in some embodiments involve iterations of fitting the 3D model of the first vehicle component to the 3D model of the second vehicle component and evaluating the results. After all iterations have been performed and evaluated, the processing unit may select the iteration having the highest numerical value in terms of shape similarities. The algorithm or algorithms may also stop iterating when a high enough or above a threshold value between the 3D model for each of the first and second vehicle has been reached. Shape similarities may be a numerical value of shape similarities. During identifying shape similarities, the first and second vehicle component may be rotated in 3-axes in relation to each other. Additional consideration during the step of identifying shape similarities may involve assessing 3D printability, such that instead of selection the iteration having the highest shape similarity an iteration having a lower shape similarity but is faster to 3D print is chosen.

As a simplified illustrative example: a first and a second bolt having the same body (diameter, length and thread standard), but the first bolt having an external hexagonal bolt head and the second an internal Allen hex head, may be determined as having shape similarity in terms of the body of the two bolts. Another example for shape similarity may involve a left-hand side and a right-hand side lower control arm. Each side control arm may be unique to the respective side of the vehicle but may share a central body portion, bushing connection or ball joint connection thereby forming shape similarities between the left-hand and right-hand side lower control arms.

In an embodiment, the 3D model is dependent on a specified printing technique for the 3D printer. The 3D model may be formed differently based on the desired or available 3D printer. For instance, a 3D model may be formed using additional reinforcements to account for the structural strength of the material used in the 3D printer. Additionally, the 3D printer may require that the 3D model comprises supports or additional material to reinforce or support the model as it is being 3D printed. The 3D model may also comprise excess material to improve the printing of overhangs. The 3D model may also comprise excess materials allowing for correct tolerances of the part to be produced during a second manufacturing step.

In another embodiment the 3D model is dependent on a predetermined movement scheme for the 3D printer. Forming the 3D model may account for the predetermined movement scheme of the 3D printer. Such predetermined movement scheme may be a linear movement wherein the printing head moves in one plane before continuing to a subsequently plane. Such a printer may be referred to as a 3-axis 3D printer. Another type of 3D printer may instead use 5-axis to move the print head. A 5-axis 3D printer may print directly onto irregular surfaces and allows for more complex 3D models to be printed and is also not bound to printing layer by layer in a XY-plane as a 3-axis 3D printer.

In one embodiment, the method may further comprise the steps of receiving, at a processing unit, a second indication of an undesirable operation of a vehicle, and updating, using the processing unit, the 3D model based on the second indication. The second indication of an undesirable operation of the vehicle may be based on additional sensor data being received by the processing unit. Based on the second indication of an undesirable operation of the vehicle, the 3D model may be updated to represent the vehicle component relating to the first and second indication of the undesirable operation of the vehicle. In other words, the second indication may allow for a determination which one of the two vehicle components that is faulty and update the 3D model to represent the faulty vehicle component. The updating of the 3D model may be done after 3D printing has been started.

Furthermore, the first indication is based on information received from sensors comprised with the vehicle. An indication of an undesirable operation of a vehicle may be based on onboard sensor data from a plurality of sensors received by the processing unit over a Controller Area Network (CAN bus) interface. A plurality of sensors may also form part of a separate system for transmitting sensor data through a wired and/or wireless connection to the processing unit. The sensor data may comprise data relating to a vehicle component such as temperature data, vibration data, electrical load data, torque load data, speed sensor data, force data, fluid flow data and/or optical data. More than one sensor may sense data for a single vehicle component, or one sensor may sense data relating to a plurality of vehicle components. The sensor data is received by the processing unit and the processing unit may, based on the data, determine a first indication of an undesirable operation of a vehicle.

In another embodiment, the step of identifying the first and the second vehicle component comprises identifying, using the processing unit, a plurality of vehicle components having a relation to the undesirable operation, determining, using the processing unit and for each of the plurality of vehicle components, a likelihood for impacting the operation of a vehicle in the undesirable manner, and selecting, using the processing unit, the first and the second vehicle component identified to have the highest likelihood. Identifying the plurality of components having a relation to the undesirable operation may be based on an error scheme, or a fault code such as a diagnostic fault code (DTC).

The diagnostic fault code may be based on sensor data operating out-of-range of normal operation. Based on identifying the plurality of the vehicle components having a relation to the undesirable operation of the vehicle, a likelihood for impacting the operation of the vehicle in the undesirable manner may be determined. The likelihood for impacting the operation in the undesirable manner may be done using an algorithm calculating a numeric probability value for a vehicle component. Alternatively, the likelihood for impacting the operation of the vehicle in an undesirable manner may be done using machine learning techniques. The likelihood for impacting the operation in an undesirable manner may be used by the processing unit to select the first and second vehicle components having the highest likelihood.

According to another aspect of the present disclosure there is provided an arrangement for three-dimensional (3D) printing of at least one component for a vehicle, the arrangement comprising a 3D printer and a processing unit, wherein the arrangement is adapted to receive, at the processing unit, a request to form a first vehicle component, acquire, using the processing unit, a first 3D bounding space for the first vehicle component, form, using the processing unit, a 3D model for the first vehicle component based on the request and the first 3D bounding space, and instruct, using the processing unit, a 3D printer to print the 3D model. Effects and advantages of this aspect of the present disclosure are largely analogous to those discussed above in relation to the previous aspects of the present disclosure.

According to a further aspect of the present disclosure there is provided a computer program product comprising a non-transitory computer readable medium having stored thereon computer program means for operating a processing unit to perform three-dimensional (3D) printing of at least one component for a vehicle, wherein the computer program product comprises: code for receiving, at the processing unit, a request to form a first vehicle component, code for acquiring, using the processing unit, a first 3D bounding space for the first vehicle component, code for forming, using the processing unit, a 3D model for the first vehicle component based on the request and the first 3D bounding space, and code for instructing, using the processing unit, a 3D printer to print the 3D model. Effects and advantages of this aspect of the present disclosure are largely analogous to those discussed above in relation to the previous aspects of the present disclosure.

The computer readable medium may be any type of memory device, including one of a removable nonvolatile random-access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1A:
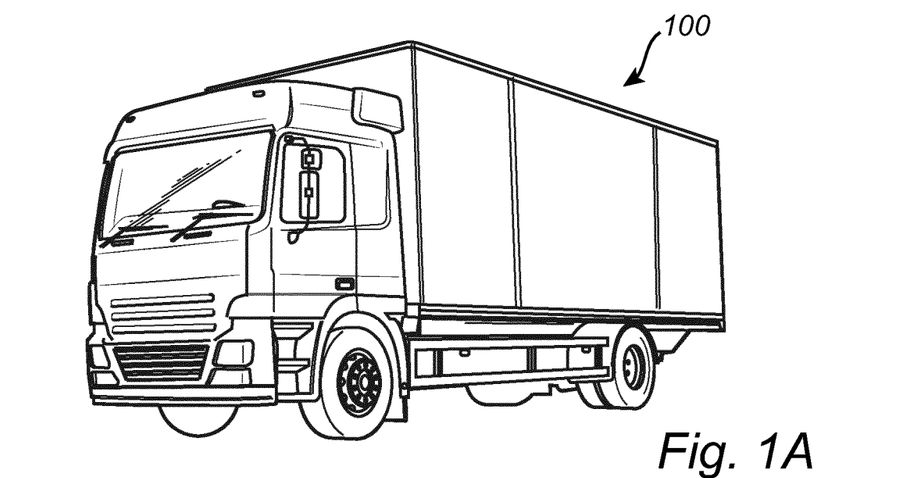
FIG. 1A illustrates a truck, 1B a bus and 1C a wheel loader in which the control system according to the present disclosure may be incorporated.
Figure 1B:
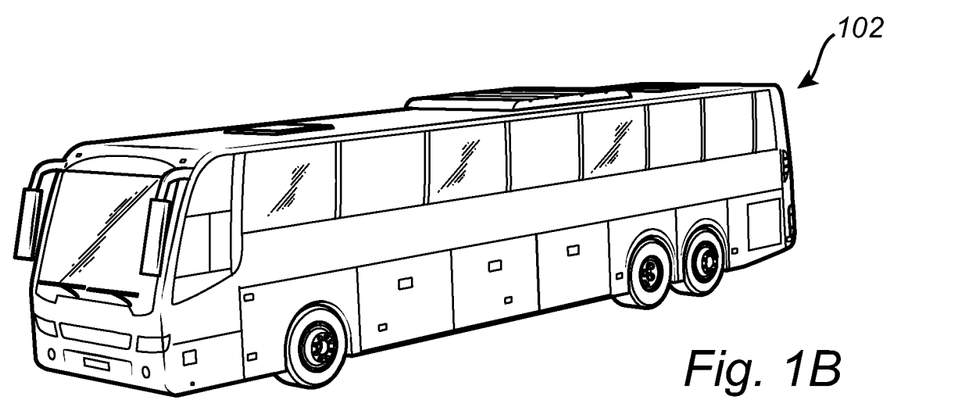
Figure 1C:
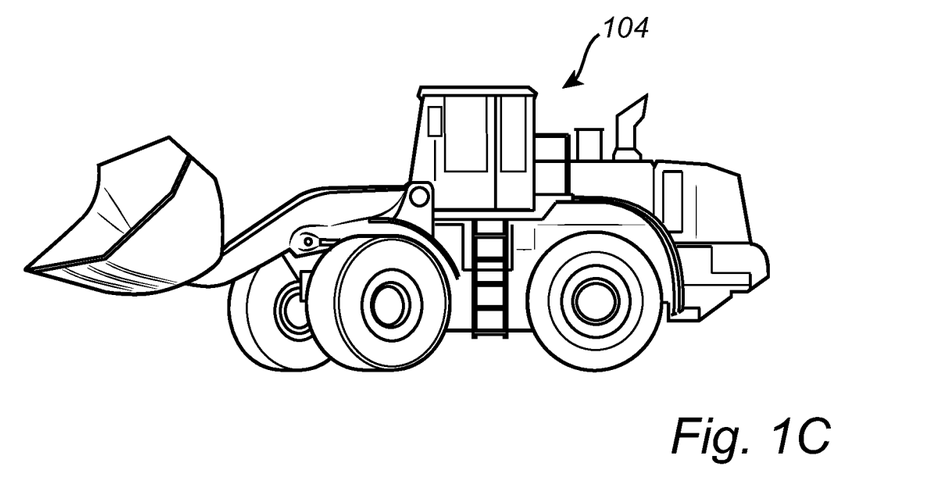
Figure 2:
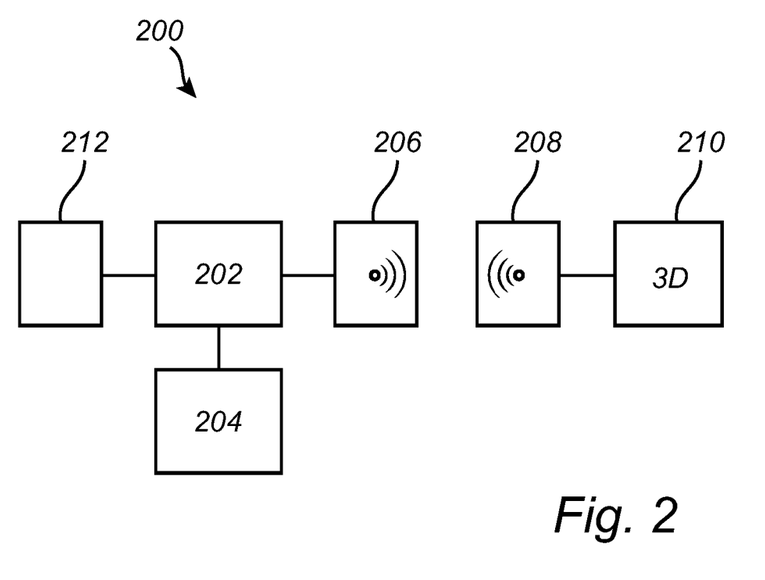
FIG. 2 illustrates a conceptual arrangement in accordance to a currently preferred embodiment of the present disclosure.

Referring now to the drawings and to FIG. 1A in particular, there is depicted an exemplary vehicle, here illustrated as a truck 100, in which an arrangement 200 (as shown in FIG. 2) according to the present disclosure may be incorporated. The arrangement 200 may of course be implemented, possibly in a slightly different way, in a bus 102 as shown in FIG. 1B, wheel loader 104 as shown in FIG. 1C, a car, a bus, etc. In addition to incorporating the arrangement 200 in a vehicle, the arrangement may be arranged off-board the vehicle at e.g. a remote facility, such as possibly a service center.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the arrangement 200, comprising a processing unit 202. In some embodiments, the processing unit 202 may receive data from one or a plurality of sensors 204, such as e.g. vibration sensors, etc., as will be further elaborated below. The processing unit 204 further comprises a communications unit 206 for communicating wired or wirelessly with the sensor(s) 204. In addition, the communications unit 206 may communicate with a remote processing unit such as a server arranged at a service center (not shown). The arrangement further comprises a 3D printer 210 in communication with the processing unit 202 through a communications interface shown as a second communications unit 208. The 3D printer 210 may be arranged remotely from the processing unit 202, at a manufacturing facility or manufacturing company. Communication between the processing unit and the 3D printer 210 may be done using Internet. The processing unit 202 may further be in communication with a server comprising a database 212 of vehicle components including 3D models and 3D bounding spaces for said vehicle components. By connecting to the database 212 the processing unit 202 may download or receive (be sent) 3D bounding spaces for a respective vehicle component.

For reference, the processing unit 202 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

During operation of the arrangement 200, the processing unit 202 may read data from sensors 204 comprising vehicle and vehicle component data. The data may be analyzed by the processing unit 202 in order to determine any undesirable vehicle operation. Alternatively, the data may be communicated wirelessly from the processing unit 202 to an internet connected server (not explicitly illustrated) wherein the data is analyzed. The results may be forwarded back to the processing unit 202 and when the processing unit is arranged onboard a vehicle, the results may be displayed to a vehicle operator. The results may also be forwarded to a service center wherein an AI (Artificial Intelligence) computer or a human service technician may determine one or a plurality of vehicle components may be faulty and in need of servicing or replacement. The processing unit 202 may receive a request to form a first vehicle component. The request may be done using a vehicle operator, an AI computer or a service technician. The request may comprise information that enables the first vehicle component to be identified through a lookup in a database 212 or the request may comprise a complete 3D model of the first vehicle component including tolerances, possible printing materials and further first vehicle component properties.

The 3D printer 210 shown in FIG. 2 may use any known 3D printing technique and may be a Selective Laser Sintering (SLS) printer, Selective Laser Melting (SLM) printer, Electronic Beam Melting (EBM) printer or 3D arc welding printer.

Figure 3A:
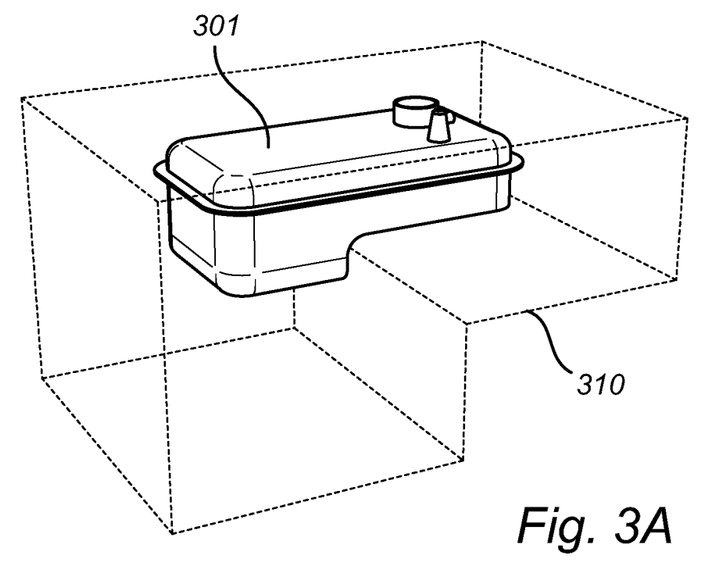
FIGS. 3A-3B exemplifies operation of the arrangement as shown in FIG. 2.
Figure 4A:
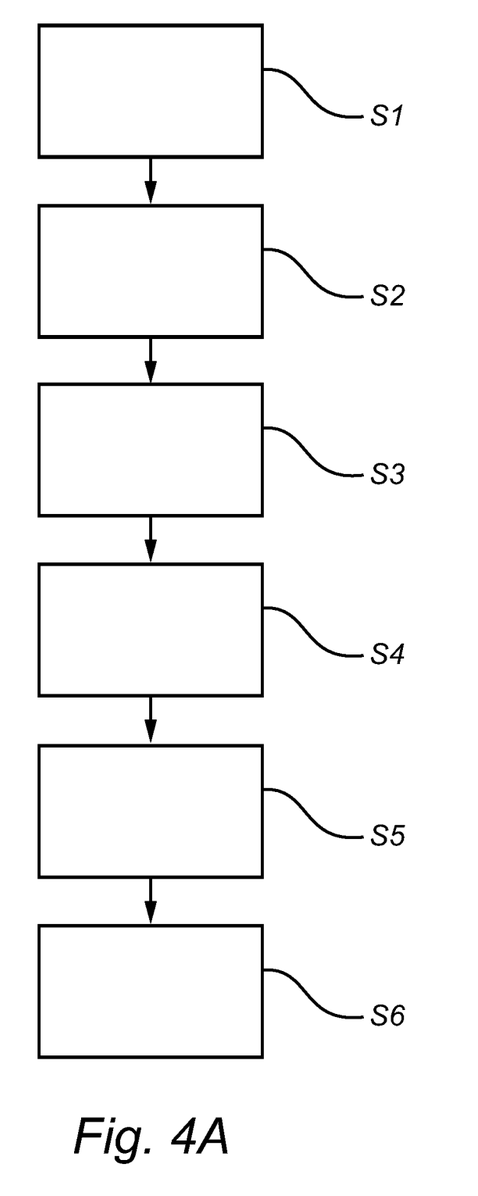
FIGS. 4A-4B illustrates the processing steps for performing the method according to the present disclosure.

With further reference to FIGS. 3A and 4A, there is presented the general operation of the arrangement 200 as shown in FIG. 2 for three-dimensional (3D) printing of a vehicle component 301 shown in FIG. 3A as a coolant water reservoir 301 to be mounted in an engine bay of a vehicle. For example, the coolant water reservoir 301 may be damaged and leaking coolant, thereby in need of replacement.

FIG. 4A shows a step of receiving S1, at the processing unit 202, a first indication of an undesirable operation of the vehicle; and a step of identifying S2, using the processing unit 202, at least the first vehicle component 301 as relating to the undesirable operation of the vehicle. Both steps S1 and S2 may be performed prior to the step of receiving S3, the request to form the first vehicle component 301. The first indication may be based on sensor data from a sensor 204 and the first indication may be used to identify at least the first vehicle component 301 as relating to the to the undesirable operation of the vehicle. As indicated above, it may be possible to include a plurality of sensors 204 with the vehicle.

The processing unit 202 subsequently receives, S3, a request to form a first vehicle component 301. The request may originate from an automated service system analyzing sensor data from vehicle sensor 204 of the vehicle. Alternatively, the request may be done by a service technician reviewing sensor data from vehicle sensors 204, or by the vehicle operator. In one example, the vehicle operator is presented information regarding undesirable operation of the vehicle as well as sensor data from vehicle sensors 204 as well as thresholds related to the sensor data. The vehicle operator may review the information send the request. The request may also be done by the vehicle operator, selecting the vehicle component in a graphical user interface (GUI), after having manually reviewed the vehicle and tracked the source of the undesirable operation.

After receiving the request to form a first vehicle component, the processing unit 202 acquires S4, a first 3D bounding space 310 for the first vehicle component 301. FIG. 3A shows a first example of a 3D bounding space 310 for a first vehicle component. In 3A, the first 3D bounding space 310 for the first vehicle component 301 is defined as the 3D space around the first component 301 that a printed 3D model of the first vehicle component 301 may not exceed in order to avoid fouling of the printed 3D model of the first vehicle component 301 and the surrounding body and further vehicle components of the vehicle. In other words, the first 3D bounding space 310 limits the shape of a 3D printed first vehicle component 301 in order for the 3D printed first vehicle component 301 to fit when it is mounted to the vehicle.

The first 3D bounding space 301 may also comprise information regarding maximum dimensions of the 3D printed model of the first vehicle component 301 related to moving the 3D printed model into a mounting position. Such dimensions may be based on other vehicle components fouling with the 3D printed model of the first vehicle component 301 when it is being moved into a mounting position but not after being mounted.

The processing unit 202 further forms, S5, a 3D model of the first vehicle component 301 based on the request and the first 3D bounding space 310 acquired in step S4. The request may comprise structural, mechanical and material limitations for the 3D model that may be combined with 3D volume and size constraints forming part of the 3D bonding space 310. Step S5 may comprise sub-steps (not shown) done iteratively in order to optimize the 3D model based on the request and the first 3D bounding space 310. The 3D model formed in step S5 may comprise information necessary to print the 3D model on a 3D printer, as well as any necessary secondary manufacturing steps needed to complete the physical first vehicle component 301 based on the 3D model. The 3D model may be in the form of a print file ready to be sent to a 3D printer.

The processing unit 202 further, instructs, S6, a 3D printer to print the 3D model. Instructions may be sent to a 3D printer from the processing unit 202 through a machine-to-machine interface.

Figure 3B:
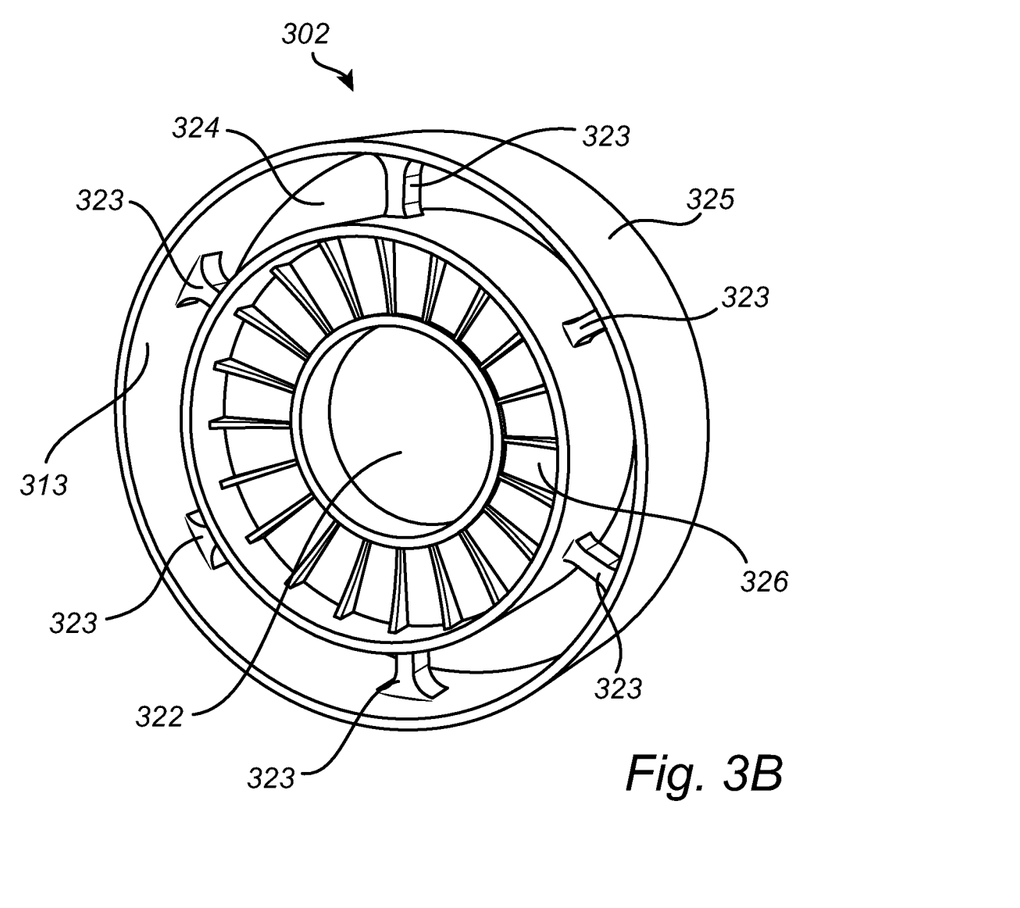

FIG. 3B shows a side view of a first and a second vehicle component in the form of a first and a second belt follower wheel 320, 321 for guiding a belt on an engine. The first and the second belt follower wheel 320, 321 each comprise a matching opening 322 for receiving a bearing. FIG. 3B further shows the first and second belt follower wheel 320, 321 comprising a respective 3D bounding space 310, 311. FIG. 3B further shows a printed vehicle component 302 in the form of a combination of the first and second belt follower wheels 320, 321. The printed vehicle component comprises an opening 322 for receiving a bearing, the opening matching the opening 322 shown for the first and second belt follower wheels 320, 321. The vehicle component 302 further comprises an outer edge 325 conforming to the outer edge 313 of the first belt follower wheel 320 and a plurality of connecting portions 323 formed using separating slots 324. The connecting portions 323 extend and connect an outer surface 312 of the second belt follower wheel 321 and an inner surface 314 of the first belt follower wheel 320. As the vehicle component 302 is shown in FIG. 3B, the vehicle component may be mounted to an engine and function as the second belt follower wheel 320. Further, by removing the connecting portions 323 the vehicle component 302 may be turned into the first belt follower wheel 321. Removal of the connection portion 323 may be done using secondary manufacturing techniques.

Forming the 3D model using the method disclosed allows for printing of the 3D model to be made before exact knowledge of if the first or the second vehicle component 320,321 is the probable cause of the undesirable operation of the vehicle.

Forming the 3D model combining the first and the second vehicle component 320, 321, may be done by rotation of one of a 3D model and 3D bounding space of the first vehicle component in relation to a 3D model and 3D bounding space of the second vehicle component. The most advantageous 3D model combining the first and the second vehicle component may also be referred to as a common 3D model.

Figure 4B:
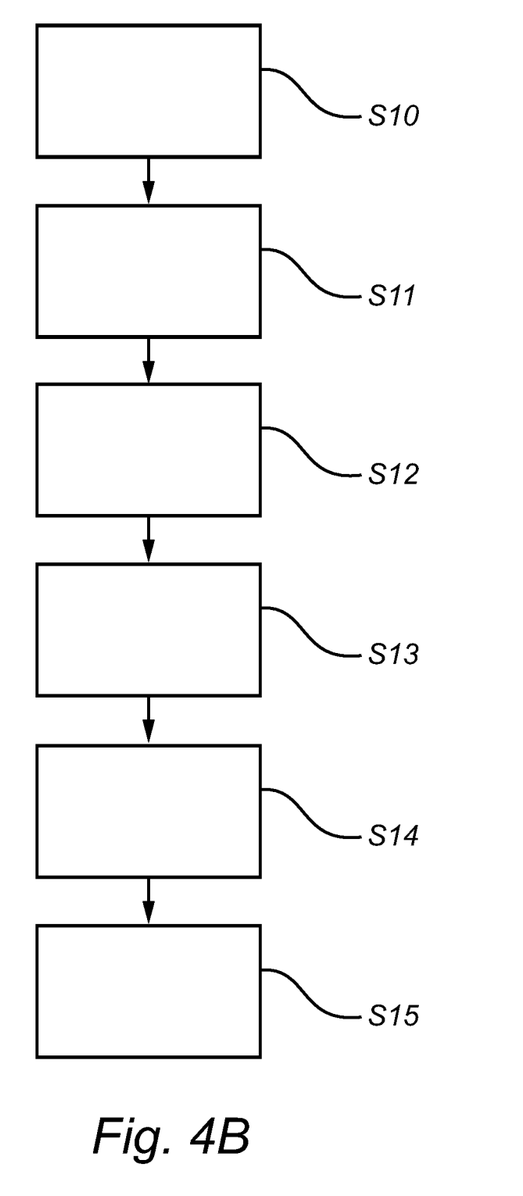

FIG. 4B shows an alternative embodiment of the method shown in FIG. 4A, wherein the processing unit 202 receives S10, a first indication of an undesirable operation of the vehicle. The indication may be based on sensor data collected from a sensor 204. Based on the first indication of an undesirable operation in S10, the processing unit 202 identifies S11 a plurality of vehicle components having a relation to the undesirable operation and thereafter determines S12 using the processing unit 202 and for each of the plurality of vehicle components, a likelihood for impacting the operation of a vehicle in the undesirable manner. The determination may be done using computer algorithms based on vehicle fault statistics combined with the sensor data. Based on determining S12 the likelihood of impacting the operation of the vehicle, a step of selecting S13, using the processing unit 202, a first and the second vehicle component identified to have the highest likelihood may be done. This step makes a selection of the most probable vehicle components impacting the operation of the vehicle. After selecting the first and second component the method may present the first and second component to a service technician or vehicle operator. The method may then proceed by the processing unit 202 receiving a request to form a first vehicle component in a manner as disclosed in relation to steps S3 to S6 of FIG. 4A.

FIG. 4B further shows a step of receiving S14, at the processing unit 202, a second indication of an undesirable operation of the vehicle. A second indication may be based on additional sensor data 204 received by the processing unit 202, or vehicle operator input. For instance, the operator may annex the first and second vehicle component selected in the step of selecting S13 by inputting information to an operator interface. Based on the second indication of an undesirable operation of the vehicle the method in a step of updating S15, the processing unit may update the 3D model. This step is beneficial when a 3D printer 210 allows for amending print jobs during printing as printing of a 3D model may commence before the exact vehicle component to print is determined.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for three-dimensional (3D) printing of at least one component for a road vehicle, the method comprising:
   receiving, at the processing unit, a first indication of an undesirable operation of the vehicle,
   identifying, using the processing unit, at least the first vehicle component as relating to the undesirable operation of the vehicle,
   receiving, at a processing unit, a request from an automated control system or from a user interaction to form a first vehicle component,
   acquiring, using the processing unit, a first 3D bounding space for the first vehicle component,
   forming, using the processing unit, a 3D model for the first vehicle component based on the request and the first 3D bounding space,
   receiving, at the processing unit, a second indication of an undesirable operation of the vehicle,
   updating, using the processing unit, the 3D model based on the second indication, and
   instructing, using the processing unit, a 3D printer to print the 3D model.

2. The method of claim 1, wherein the first 3D bounding space for the first vehicle component is dependent on predefined physical boundaries in a vicinity of an expected mounting position of the first vehicle component.

3. The method of claim 1, wherein a second vehicle component is identified as relating to the undesirable operation of the vehicle.

4. The method of claim 3, wherein the second vehicle component defines the first 3D bounding space for the first vehicle component.

5. The method of claim 3, wherein the 3D model is further formed based on the second vehicle component.

6. The method of claim 3, wherein identifying the first vehicle component and the second vehicle component further comprises:
   identifying, using the processing unit, a plurality of vehicle components having a relation to the undesirable operation,
   determining, using the processing unit and for each vehicle component of the plurality of vehicle components, a likelihood for impacting operation of the vehicle in the undesirable manner, and
   designating, using the processing unit, the two vehicle components of the plurality of vehicle components with the highest two likelihoods for impacting operation of the vehicle in the undesirable manner as the first and the second vehicle component.

7. The method of claim 1, wherein the 3D model is dependent on a specified printing technique for the 3D printer.

8. The method of claim 1, wherein the 3D model is dependent on a predetermined movement scheme for the 3D printer.

9. The method of claim 1, wherein the first indication is based on information received from sensors located with the vehicle.

10. A system for three-dimensional (3D) printing of at least one component for a road vehicle, the system comprising a 3D printer and a processing unit, wherein the system is configured to:
    receive, at the processing unit, a first indication of an undesirable operation of the vehicle,
    identify, using the processing unit, at least the first vehicle component as relating to the undesirable operation of the vehicle,
    receive, at the processing unit, a request from an automated control system or from a user interaction to form the first vehicle component,
    acquire, using the processing unit, a first 3D bounding space for the first vehicle component,
    form, using the processing unit, a 3D model for the first vehicle component based on the request and the first 3D bounding space,
    receive, at the processing unit, a second indication of an undesirable operation of the vehicle,
    update, using the processing unit, the 3D model based on the second indication, and
    instruct, using the processing unit, the 3D printer to print the 3D model.

11. The system of claim 10, wherein the first 3D bounding space for the first vehicle component is dependent on predefined physical boundaries in a vicinity of an expected mounting position of the first vehicle component.

12. The system of claim 10, wherein at least a second vehicle component is identified as relating to the undesirable operation of the vehicle.

13. The system of claim 12, wherein the second vehicle component defines the first 3D bounding space for the first vehicle component.

14. The system of claim 12, wherein the 3D model is further formed based on the second vehicle component.

15. The system of claim 10, wherein the 3D model is dependent on a specified printing technique for the 3D printer.

16. A computer implemented method for three-dimensional (3D) printing of at least one component for a vehicle, the method comprising the steps of:
    receiving, at a processing unit, a first indication of an undesirable operation of the vehicle,
    identifying, using the processing unit, a plurality of vehicle components having a relation to the undesirable operation,
    determining, using the processing unit and for each vehicle component of the plurality of vehicle components, a likelihood for impacting operation of the vehicle in the undesirable manner,
    designating, using the processing unit, the two vehicle components of the plurality of vehicle components with the highest two determined likelihoods for impacting operation of the vehicle in the undesirable manner as the first and the second vehicle components, respectively,
    receiving, at the processing unit, a request to form the first vehicle component,
    acquiring, using the processing unit, a first 3D bounding space for the first vehicle component,
    forming, using the processing unit, a 3D model for the first vehicle component based on the request and the first 3D bounding space, and instructing, using the processing unit, a 3D printer to print the 3D model.

\* \* \* \* \*